UNITED STATES PATENT OFFICE.

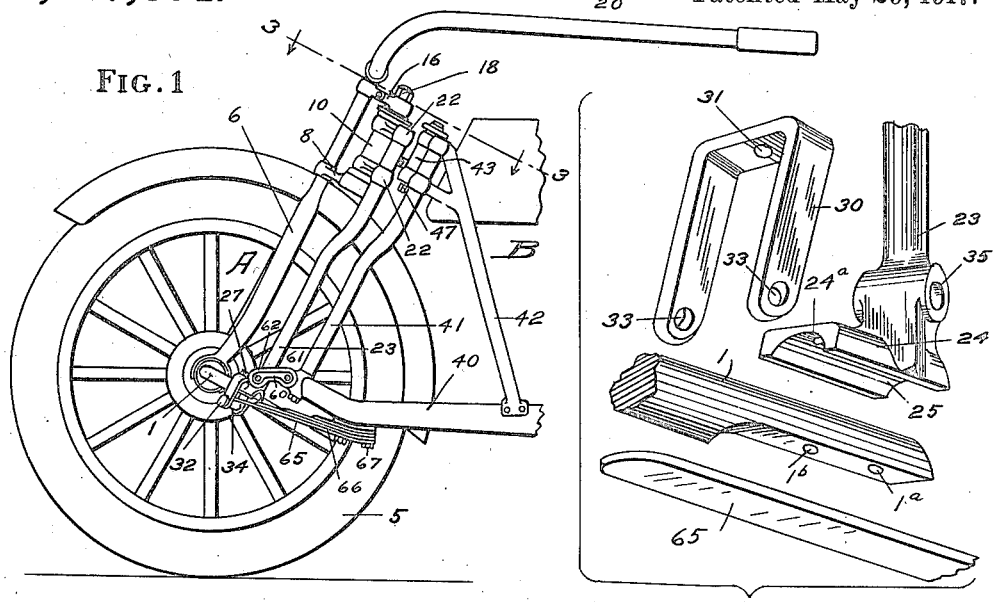
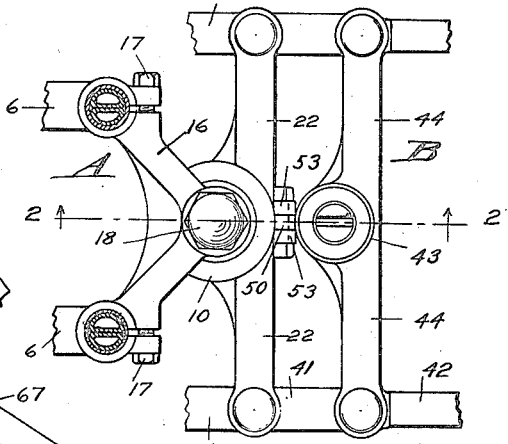
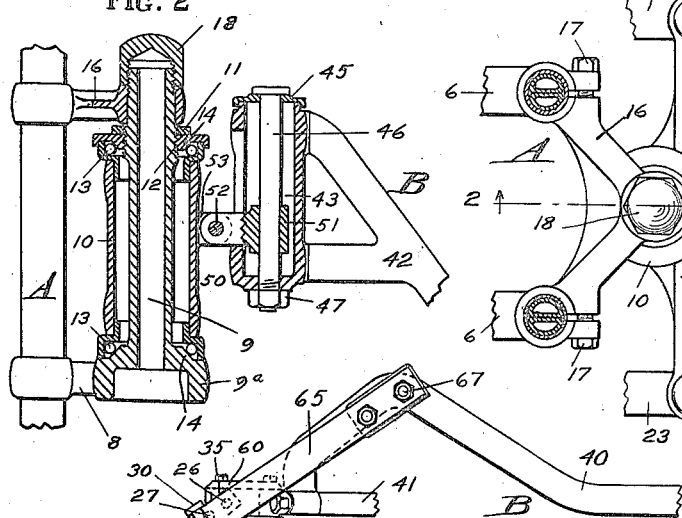
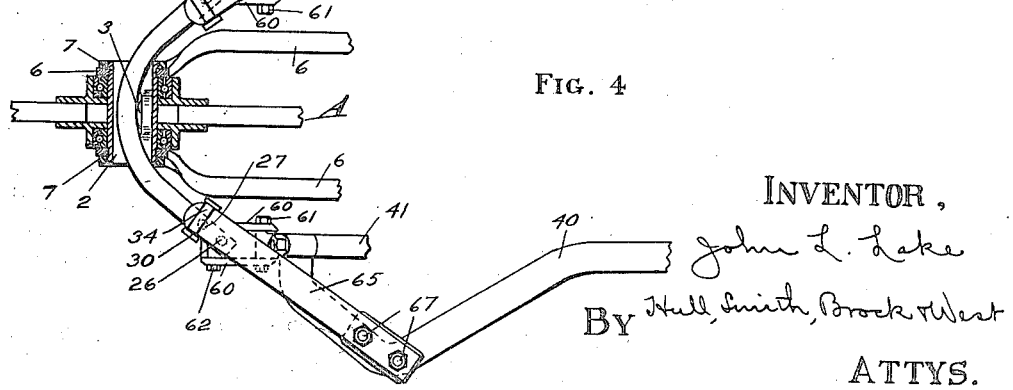

JOHN L. LAKE, OF CLEVELAND, OHIO, ASSIGNOR TO ANDREW S. GRANT, OF TORONTO, CANADA.

VEHICLE.

1,227,634. Specification of Letters Patent. Patented May 29, 1917.

Application filed August 14, 1915. Serial No. 45,446.

*To all whom it may concern:*

Be it known that I, JOHN L. LAKE, a subject of the King of Great Britain, and a citizen of the Dominion of Canada, residing at Cleveland, in the county of Cuyahoga and State of Ohio, have invented a certain new and useful Improvement in Vehicles, of which the following is a full, clear, and exact description, reference being had to the accompanying drawings.

This invention relates to improvements in spring suspension for vehicle frames, and particularly to a spring suspension that is especially adaptable to motorcycles. The invention further relates to certain other improvements in motorcycle construction, as will appear from the following description.

The spring suspension herein disclosed is peculiarly adapted for incorporation in a motorcycle of the general type shown in the patent to Johnston No. 1,089,647, issued March 10, 1914. The aforesaid patent shows a supporting and a supported structure, the former comprising a frame involving a curved track along which a member is movable whereon the steering wheel of the vehicle is journaled, and mechanism for moving the aforesaid member along the track thereby to steer the vehicle; while the latter structure comprises a frame that is connected by links to the supporting structure so that the supported structure has a definite movement vertically of and toward and from the supporting structure.

The object of my present invention is to provide a spring suspension for use between the supporting and supported structures of vehicles (especially of the aforesaid class), that is simple of construction; that is economical of production and maintenance; that is strong and durable; and that is very resilient yet comparatively slow of vibration, thereby insuring comfort and ease of riding and long life to the vehicle.

A further object is to provide improved and simplified means for connecting together the supporting and supported structures of vehicles of the aforesaid class that operates easily, the same being free from any binding tendencies.

In the accompanying drawing I have shown my improved spring suspension incorporated in a motorcycle of the general type above described, and while I will proceed to describe it in such connection, it will be understood that the invention has many other possibilities; and although I will proceed to describe, in detail, this particular spring suspension and the aforesaid improved connection between the structures of the vehicle, I wish to be understood as not limiting myself to such structural details further than is required by the terms of the annexed claims and is rendered necessary by the state of the prior art.

In the drawing, wherein similar reference characters designate corresponding parts throughout the several views, Figure 1 is a fragmentary side elevation of a motorcycle embodying my invention; Fig. 2 is an enlarged central vertical section through the heads of the supporting and supported structures; Fig. 3 is a plan view of the parts of Fig. 2 taken on the line 3—3 of Fig. 1; Fig. 4 is a fragmentary bottom plan view of the portion of the vehicle shown in Fig. 1, the steering wheel of the vehicle being shown in central section; and Fig. 5 is a perspective view of the several parts adjacent the free end of one of the springs, said parts being separated to more clearly show their respective shapes.

The supporting structure of the vehicle is designated A and comprises a curved track 1 along which a sleeve or member 2 is movable, suitable antifriction rollers 3 being employed between said sleeve or member and the track, as clearly disclosed in the patent above referred to. These features constitute no part of my invention and it is therefore deemed unnecessary to further illustrate them. The sleeve or member 2 has journaled upon it the steering wheel 5, and the lower ends of fork members 6 are clamped to the opposed ends of the sleeve or member 2 by means of nuts 7. The upper ends of the fork members 6 are connected by a branched bracket 8 which is formed integral with a kingbolt 9 that passes upward through the head 10 of the supporting structure and is retained within said head by means of a nut 11 that is screwed upon a threaded portion 12 of the bolt. Suitable ball bearings 13 including the usual cones 14, etc., are interposed between the nut 11 and the head 9ª of the bolt, and the respective adjacent ends of the head 10. Above the nut 11, a bracket 16 is connected to the kingbolt, said bracket being similar in plan to the bracket 8, and the branches of the bracket 16 are connected to the upper ends of the fork members 6 by being split and passed over their upper ends and clamped thereabout by the screws 17. A nut 18 is applied to the threaded end of the kingbolt 9 and bears upon the hub of the bracket 16. Handle bars 20 have rigid connection with the upper ends of the fork members 6, and from the foregoing description it will be seen that when said handle bars are turned, the kingbolt will be oscillated within the head 10 and the wheel-carrying sleeve or member 2 will be caused to traverse the track 1 to steer the vehicle.

The head 10 is provided with two pairs of opposed laterally extending arms 22 which have rigid connection at their outer ends with uprights 23. The lower ends of these uprights are provided with angular bearing plates 24, having their underneath faces recessed at 25 for the reception of the ends of the track 1. The ends of the track are secured to the uprights by cap screws 26 that pass through the apertures 1$^a$ of the track and are screwed into the bearing plates 24, and by bolts 27 that extend through the alining holes 1$^b$ and 24$^a$ of the track and bearing plates, respectively. A U-shaped clip 30 is arranged to straddle the forward end of each of the bearing plates 24 and the parallel branches of the clip depend below the track 1. The previously mentioned bolt 27 is shown as passing through the aperture 31, in the transverse portion of the clip 30, and serves to hold the entire assembly together. A bolt 32 (or the equivalent thereof) passes through the apertures 33 in the lower ends of the branches of each clip 30, and preferably supports between said branches an antifriction roller 34. It will be observed that the uprights 23 are provided with transverse hollow cylindrical bosses 35, adjacent the bearing plates 24, for a purpose which will presently be described.

The supported structure of the vehicle, designated B, is made up of side members 40 and upright braces 41 and 42 which rise from each of the said side members and meet at the upper ends to form with the aforesaid side members, opposed triangular frames which support, between their upper ends, a head 43, said head having two pairs of opposed laterally extending arms 44 which connect, at their outer ends, with the upper ends of the upright members 41 and 42. The head 43 is tubular, and a plate 45 is applied to the upper end thereof, said plate having an aperture through which a bolt 46 extends. The bolt passes centrally down through the head and through an aperture in the bottom wall thereof where the threaded end of the bolt has applied to it a nut 47. A hinge member 50 has formed integral with it a sleeve 51 that is slidable along the bolt 46, and the forward end of the hinge member 50 is pivoted upon a bolt 52 that is supported by and between the ears 53 which extend rearward from the head 10 and which constitute the other member of the hinge connection between the supporting and supported structures.

The lower forward end of the supported structure is connected to the lower end of the supporting structure by means of two pairs of links 60, one pair being located on each side of the vehicle. Each of the side members 40 has a transverse eye at its forward end for the accommodation of a bolt 61 whereon one end of a pair of the aforesaid links are pivoted, while the opposite ends of said links are pivoted upon a bolt 62 that extends through the transverse boss 35 of the corresponding upright 23 of the supporting structure. This connection with the hinge connection already described, allows a relative vertical movement between the structures and by reason of the links 60, the portion of the supported structure wherewith they are connected is caused to move through an arcuate course. With this relative movement between the structures in mind, we will now consider the spring suspension.

65 represents leaf springs (reinforced by the auxiliary springs 66 of like nature) that are secured by screws 67 to the underneath side of the side members 40, said springs extending forwardly and inwardly in the general direction of the forward ends of said side members, as will be clearly seen from Fig. 4, and having their free ends bearing upon the antifriction rollers 34, suspended beneath the ends of the track 1 by the clips 30. The springs thus yieldingly sustain the supported structure normally in the position shown in the drawing, and any depression of the supported structure with respect to the supporting structure will cause the springs to yield, while their forward ends traverse the rollers 34 to compensate for the movement of the adjacent part of the supported structure toward the supporting structure through the arcuate course already described.

Having thus described my invention, what I claim is:—

1. In a vehicle, the combination of a supporting and a supported structure, a link having its opposed ends pivoted respectively to adjacent parts of the aforesaid structures, means hingedly connecting portions of the structures remote from the aforesaid link, said means being slidable with respect to one structure, a leaf spring secured to one structure, and a bearing carried by the other structure for coöperation with the free end of the spring.

2. In a vehicle, the combination of a supporting and a supported structure, a link having its opposed ends pivoted to adjacent parts of the aforesaid structures, means hingedly connecting portions of the structures remote from the aforesaid link, said means being slidable with respect to one structure, a leaf spring secured to one structure, and a roller carried by the other structure for coöperation with the free end of the spring.

3. In a vehicle, the combination with a supporting structure comprising a head and a track that are rigidly connected, a steering wheel that is journaled upon a member slidable upon said track, and means supported by the head for sliding said member; and a supported structure comprising a frame having a head that is located adjacent the head of the supporting structure, of means hingedly connecting the heads of the two structures, said means being slidable with respect to one head, a pair of links having their corresponding opposed ends pivoted respectively to adjacent parts of the structures in the vicinity of the aforesaid track, a bearing carried by the supporting structure on opposite sides of the steering wheel, and a leaf spring secured to each side of the frame of the supported structure, the free end whereof bears upon one of the aforesaid bearings.

4. In a vehicle, the combination with a supporting structure comprising a head and a track that are rigidly connected, a steering wheel that is journaled upon a member slidable upon said track, and means journaled within the head for sliding said member; and a supported structure comprising a frame having a head that is located adjacent the head of the supporting structure, of means hingedly connecting the heads of the two structures, said means being slidable with respect to one head, a pair of links having their corresponding opposed ends pivoted respectively to adjacent parts of the structures in the vicinity of the aforesaid track, antifriction bearings suspended below portions of the aforesaid track on opposite sides of the steering wheel, and a leaf spring secured to each side of the frame of the supported structure, the free end whereof bears upon one of the aforesaid antifriction bearings.

5. In a vehicle, the combination with a supporting and a supported structure, the former structure comprising a head and a curved track that are rigidly connected together, a steering wheel journaled upon a member that is slidable upon said track, and a steering mechanism journaled within the aforesaid head and rigidly connected to the supporting member of the steering wheel; and the latter structure comprising a frame having a head, of a vertical pin carried by the last mentioned head, a hinge member slidable upon said pin, a second hinge member secured to the head of the supporting structure and pivotally connected to the first mentioned hinge member, links having each their opposed ends pivoted respectively to adjacent portions of the supporting and supported structures in the vicinity of the aforesaid track, a U-shaped clip secured to each end of the track and having opposed branches which depend therefrom, a roller pivoted between the branches of each clip, a leaf spring having one of its ends secured to the frame of the supported structure and its opposite end bearing upon one of the aforesaid rollers, and a plurality of auxiliary spring leaves for reinforcing each of the first mentioned springs.

6. In a vehicle, the combination with a supporting and a supported structure, the former comprising a head and a curved track that are rigidly connected, a steering wheel journaled upon a member that is slidable upon the track, a steering mechanism journaled within the aforesaid head and rigidly connected to the supporting member of the steering wheel, and the latter comprising a frame having a head, and a pin extending vertically therethrough, of a hinge member slidable upon said pin, a second hinge member secured to the head of the supporting structure and pivotally connected to the first mentioned hinge member, links having each their opposed ends connected to adjacent portions of the supporting and supported structures in the vicinity of the aforesaid track, a U-shaped clip secured to each end of the track and having opposed branches which depend therefrom, a roller pivoted between the branches of each clip, and a leaf spring having one of its ends secured to the frame of the supported structure and its opposite end bearing upon one of the aforesaid rollers.

7. In a vehicle, the combination with a supporting structure comprising a head and a track that are rigidly connected, a steering wheel that is journaled upon a member movable along said track, and means supported by the head for moving said member; and a supported structure comprising a frame having a head that is located adjacent the head of the supporting structure; of means hingedly connecting the heads of the two structures, said means being slidable with respect to one head, a pair of links having their corresponding opposed ends pivoted respectively to adjacent parts of the structures, and spring connections between the supporting and supported structures.

8. In a vehicle, the combination with a supporting and a supported structure, the former structure comprising a head and a curved track that are rigidly connected together, a steering wheel journaled upon a member that is movable along said track, and a steering mechanism journaled within the aforesaid head and rigidly connected to the supporting member of the steering wheel; and the latter structure comprising a frame having a head; of a vertical pin carried by the last mentioned head, a hinge member slidable upon said pin, a second hinge member secured to the head of the supporting structure and pivotally connected to the first mentioned hinge member, links having each their opposed ends pivoted respectively to adjacent portions of the supporting and supported structures, and spring connections between the structures.

9. In a vehicle, the combination of a supporting and a supported structure, means connecting but allowing movement between the structures, a leaf spring rigidly secured to the supported structure, and a roller carried by the other structure whereon the free end of the spring normally bears.

10. In a vehicle, the combination of a supporting and a supported structure, means yieldingly connecting portions of said structures, further means hingedly connecting the structures at a point remote from the former means, the latter means being slidable with respect to one structure, a leaf spring secured to one structure, and a bearing carried by the other structure for coöperation with the free end of the spring.

In testimony whereof, I hereunto affix my signature in the presence of two witnesses.

JOHN L. LAKE.

Witnesses:
M. L. Thomsen,
F. D. McMahon.